2,744,049
Patented May 1, 1956

2,744,049

STABILIZED DENTAL CREAMS

Gerhard Martin Salzmann, Franklin Lakes, N. J., and Robert Joseph Schiraldi, New York, N. Y., assignors to Colgate-Palmolive Company, a corporation of Delaware No Drawing. Application July 18, 1952,
Serial No. 299,744

8 Claims. (Cl. 167—93)

The present invention relates to dental creams containing a partial ester of glycerine and higher fatty acid material.

Dental creams or toothpastes which are extrudible from collapsible tubes possess a characteristic physical state. Such products comprise generally an admixture of suitable polishing agent and liquids proportioned so as to form a smooth, homogeneous, extrudible cream-like paste. The water-insoluble polishing agent is essentially in suspension in the liquid phase which is usually set to a gel or the like. It is requisite that such dental creams exhibit certain properties, such as substantial freedom from graininess, stability to hardening in the tube, and stability to separation of liquid from solid materials such that there is extruded liquid or foam rather than a smooth, uniform paste, etc.

Many commercial dental creams contain a relatively high content of glycerine. Such material or the like contributes to some degree desirable humectant, hygroscopic and plasticizing properties to a dental cream. Substantial reduction or elimination of the glycerine content or its equivalent in the formulation may adversely affect the properties of the dental cream in the manner indicated above, the degree naturally varying with the specific formulation.

Among the water-insoluble calcium phosphate polishing agents widely used in dental creams is dicalcium phosphate dihydrate ($CaHPO_4 \cdot 2H_2O$). The use of this material in dental cream formulation is advantageous because of its physical properties but it does possess a tendency to lose its water of hydration upon aging or subjection of the dental cream to adverse conditions. As a consequence, there results an increased tendency for hardening or concreting of the paste in the tube which may even form a solid, non-extrudible mass. The glycerine content tends to stabilize the system in view of its humectant and other desirable properties. Appreciable reduction of such glycerine content therefore also increases this possibility of concreting by dicalcium phosphate in the dental cream.

It has now been found that dental creams or the like containing a calcium phosphate polishing agent having improved stability may be obtained by the incorporation of a partial glyceryl ester of higher fatty acids in an amount at least about ½% by weight, as hereinafter described and claimed. A preferred embodiment of the present invention relates to a dental cream comprising dicalcium phosphate dihydrate and a higher fatty acid monoglyceride in an amount from about ½ to 10% by weight. By means of the present invention, dental creams may be obtained having a desired substantially uniform and homogeneous body or consistency, and improved stability to adverse atmospheric conditions and aging in the tube.

The partial glyceryl esters of the higher fatty acids are known materials, and comprise the mono- and di-glyceride esters. Such materials are usually normally oily to semi-solid or solid, and essentially water-insoluble in their properties. It is preferred to use the monoglycerides of higher fatty acids of about 10–18 carbon atoms in view of the excellent results obtained thereby, particularly the monoglycerides of mixed higher fatty acids, such as may be derived from fatty materials usually. Suitable examples are the monoglycerides of capric, lauric, myristic, palmitic, stearic, oleic, coconut oil fatty acids (mixed fatty acids corresponding to the type of higher fatty acids derived from coconut oil, e. g. by saponification or hydrolysis), hydrogenated coconut fatty acids, tallow fatty solids, etc. The corresponding diglycerides may also be used, such as the diglycerides of coconut oil fatty acids, etc.

These materials should be employed in minor amount effective to improve the properties of the dental cream. In general, a minimum of at least about ½% is required in practice. The maximum amount of these partial esters will in general be up to about 20% by weight, and preferably up to about 10% of the dental cream, since substantially greater amounts may adversely affect the character of the cream. They may be added to the cream in any suitable form, such as in the form of a slurry or powder, but should be homogeneously dispersed or distributed throughout the cream during manufacture.

The present invention relates also to a dental cream comprising a water-insoluble calcium phosphate polishing agent, an organic detergent, water and a humectant, and having incorporated therein at least about ½% by weight of a partial glyceryl ester of a higher fatty acid as an agent to stabilize the cream against hardening in the tubes, separation of liquids from solids and formation of graininess.

Any suitable practically water-insoluble calcium phosphate polishing agent may be employed in the dental creams of the present invention, for example hydrated dicalcium phosphate, tricalcium phosphate etc., including suitable mixtures thereof with other polishing agents. There is a relatively large number of such materials known in the art, for example, calcium carbonate, insoluble sodium metaphosphate, aluminum hydroxide, magnesium carbonate, calcium sulfate, etc. In general, the polishing agent content will comprise a major proportion by weight of the solid ingredients. The amount utilized is variable and dependent somewhat upon the specific abrasive effects desired and the formulation, but will generally be about 20–75%, usually about 30–65% and preferably about 40–60% by weight of the dental cream.

There is also usually included an organic detergent compound in these compositions, such surface active agents being usually characterized by having a long aliphatic chain in the molecule and a water-solubilizing group. Suitable detergents may be anionic, non-ionic or cationic in structure. Such detersive agents are known and include, for example, the water-soluble salts of higher fatty acid monoglyceride monosulfate detergent (e. g. sodium salts of monosulfated monoglycerides of mixed higher fatty acids derived from coconut oil), higher alkyl sulfate detergent (e. g. sodium lauryl sulfate), alkyl aryl sulfonate detergent (e. g. sodium dodecyl benzene sulfonate), higher alkyl sulfoacetate (e. g. sodium lauryl sulfoacetate), higher fatty acid amides of amino carboxylic acids (e. g. sodium N-lauroyl sacroside), the conventional soaps of animal or vegetable fatty materials which are water-soluble salts of higher fatty acids (e. g. sodium soaps of mixed fatty acids of coconut oil), etc. In general, these detersive agents may be used in any suitable amount, such as from about 0.5 up to about 10% by weight. The non-soap or synthetic detergents in creams will usually be employed in an amount up to about 5% by weight.

It is preferred to employ the water-soluble non-soap or synthetic organic detergents, with optimum effects resulting with the anionic non-soap organic detergents, such as the sulfates, sulfonates and amides of amino acids. In general, these materials in a dental cream have high foaming activity and are more compatible with the inorganic calcium- or magnesium-containing polishing agents, particularly dicalcium phosphate dihydrate, in comparison to soaps. For example, the soaps have a greater tendency in general to react with dicalcium phosphate dihydrate forming characteristically highly water-insoluble lime soaps or the like. With synthetic detergents, moreover, the dentifrice preparations are highly effective at slightly acid, neutral or slightly alkaline pH values in contrast to the relatively high alkalinity obtained with the use of the conventional water-soluble soaps. The fatty acid monoglycerides or the like have a more pronounced tendency to hydrolyze at the ester grouping at high alkaline values. Accordingly, the preferred synthetic detergents are, in general, more compatible with the protective agents in the compositions of the present invention. Furthermore, with such non-soap detergents there is a consequent elimination of the possibility of irritation in the mouth due to the high or excessive alkalinity values in solution.

In general, the liquid in the cream will comprise chiefly such materials as water, glycerine, sorbitol, propylene glycol, etc., including suitable mixtures thereof. It is usually advantageous to use a mixture of both water and a humectant or binder such as glycerine, sorbitol, etc. The total liquid content will generally be from about 20 to about 75% and usually about 30–65% by weight of the formulation. In aqueous-humectant mixtures referred to above, the water and the humectant will usually be from about 5–50% each, and preferably 10–40% each of the total ingredients which are proportioned to form a dental cream of desired consistency.

Other adjuvant materials may be similarly incorporated in suitable amounts. It is usual to use a gelling agent such as the natural and synthetic gums and gum-like materials, e. g. Irish moss, gum tragacanth, sodium carboxymethylcellulose, starch, etc., usually in an amount up to 10% by weight of the dental cream, and preferably from 0.5–5%. Furthermore, such materials as soluble saccharin, flavoring oils (e. g. oils of spearmint, peppermint), coloring or whitening agents, antibiotics, therapeutic agents, preservatives, alcohols, etc. may be used as desired in proper amount.

As indicated, it is preferred to use the dicalcium phosphate dihydrate either in whole or part as the suitable polishing agent. The fatty acid monoglycerides or the like render dental creams containing such material more stable upon aging, particularly under adverse conditions. For example, subjection of tubes of dental creams containing the hydrated dicalcium phosphate to elevated temperatures of about 110°–140° F. for an appreciable period of time usually leads to a thickening or hardening of the cream, and possibly to eventual concreting of the cream per se. The incorporation of the indicated fatty acid esters inhibits the degree of such thickening for extended periods of time, and acts as a stabilizing agent therefor. The exact mechanism for such action is not known at this time but it is believed that the presence of the fatty acid esters results in a more stable equilibrium in the system with a reduced tendency for the dicalcium phosphate to lose its water of hydration upon aging, particularly at elevated temperatures. The optimum amount of stabilizer to hydrated dicalcium phosphate may be readily determiend, and will vary depending upon the specific formulation, such as glycerine content, etc. The use of the indicated amounts of fatty acid esters will be sufficient however to minimize or inhibit the thickening or hardening of dental creams formulated at least in part with the hydrated dicalcium phosphate.

There exists some tendency in dental creams for small discrete particles to settle out from the system, resulting in a graininess in the product which is undesirable in appearance and may even be palpable in the mouth. This graininess may develop upon aging at room temperature but is usually accentuated by low temperatures, such as 8°–40° F. The exact cause of such condition is not known, but it is believed that contributing factors are the type of gel-like structure characteristic of the cream and the presence of organic detergent material in significant amounts.

These partial glyceryl esters also act to inhibit the development of graininess in the dental creams. When these agents are incorporated therein there results an establishment of an equilibrium which tends to render the system more stable upon aging at normal or relatively cold temperature conditions. There is also produced to some degree a protective action against possible chemical and/or physical reactions among the various ingredients, such as the calcium- or magnesium-containing polishing agents and organic detergent material.

Furthermore, upon storage of a dental cream at elevated temperatures, there is usually an increased tendency for phase separation of a distinct liquid and a solid phase in contrast to a homogeneous cream. Under such circumstances, there may be extruded from the tube a liquid or foam, usually dark-colored, rather than a smooth paste. Such effects will vary in degree of course with the specific formulation but it is apparent that they similarly adversely affect the desired character of the dental cream. The presence of the fatty acid ester protective agents also prevents or inhibits such separation when employed in sufficient amounts of the order indicated.

The invention comprises the use of both water-free and glycerine-free formulations. Many of the advantages usually obtained by the presence of glycerine may be compensated for by the substitution in part or whole of the fatty acid ester protective agents. A dental cream formulation having a reduced glycerine content usually shows greater tendency to instability, particularly under severe aging conditions, e. g. 8–40° F., 110–140° F. Such reduction in glycerine appears to result in increased graininess and separation characteristics in the cream. The incorporation of the indicated monoglycerides or the like however results in suitable stability of the cream even in formulations containing no glycerine or the like.

Other humectants such as sorbitol have been suggested as glycerine substitutes. In general, sorbitol does not exhibit equivalent characteristics since formulations containing glycerine usually possess greater stability than similar formulations having an equal amount of sorbitol. It has been found, however, that creams containing sorbitol in admixture with minor amounts of the fatty acid esters exhibit marked stability to separation, graininess, etc., in comparison to sorbitol-containing creams per se. The former combination therefore permits wide variation in formulation work without loss in desired properties.

The following specific examples are further illustrative of the nature of the present invention, but it is to be understood that the invention is not limited thereto. All amounts of the various ingredients are by weight unless otherwise specified.

A suitable dental cream is prepared having approximately the following formulation:

*Example I*

|  | Percent |
|---|---|
| Dicalcium phosphate dihydrate | 54.9 |
| Monoglyceride ester of coconut fatty acids | 1.5 |
| Glycerine | 14.5 |
| Water | 22.0 |
| Sodium coconut monoglyceride monosulfate detergent | 3.75 |
| Irish moss | 1.0 |
| Sodium benzoate | 1.0 |
| Sodium saccharin | 0.15 |
| Flavor | Q. S. |

All ingredients with the exception of polishing agent and flavor are thoroughly mixed and heated to about 160° F. to form a homogeneous gel-like mass, after which the polishing agent is incorporated with stirring. The mass is cooled, flavor added, and strained to produce a smooth homogeneous cream paste, which is subsequently added to collapsible aluminum or lead tubes.

Extensive testing shows that this dental cream exhibits the desired stability even after long periods of time. The product maintains a high level of foam and a smooth, extrudible consistency with no appreciable thickening, nor evidence of graininess nor separation after aging for many months at temperatures ranging from 8°–140° F.

Other suitable formulations productive of desired results are:

Example II

| | Percent |
|---|---|
| Dicalcium phosphate dihydrate | 48.55 |
| Monoglyceride ester of coconut fatty acids | 5.00 |
| Sodium coconut monoglyceride monosulfate detergent | 3.75 |
| Water | 39.35 |
| Irish moss | 1.00 |
| Flavor, sweetening, preserving agents, etc | Q. S. |

Example III

| | Percent |
|---|---|
| Dicalcium phosphate dihydrate | 52.4 |
| Glyceryl monomyristate | 1.5 |
| Glycerine | 22.0 |
| Water | 17.0 |
| Sodium coconut monoglyceride monosulfate detergent | 3.75 |
| Gum | 1.00 |
| Flavor, sweetening, preserving agents, etc | Q. S. |

Example IV

| | Percent |
|---|---|
| Dicalcium phosphate dihydrate | 50.0 |
| Glycerine | 26.0 |
| Gum | 1.0 |
| Water | 13.0 |
| Sodium N-lauroyl sarcoside | 2.0 |
| Monoglyceride ester of coconut fatty acids | 3.0 |
| Flavor, sweetening, preserving agents, etc | Q. S. |

Example V

| | Percent |
|---|---|
| Calcium carbonate | 24.0 |
| Dicalcium phosphate dihydrate | 24.0 |
| Sorbitol | 30.0 |
| Monoglyceride ester of coconut fatty acids | 1.5 |
| Water | 15.0 |
| Sodium lauryl sulfate detergent | 2.0 |
| Gum | 1.0 |
| Flavor, sweetening, preserving agents, etc | Q. S. |

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention what is claimed is:

1. A dental cream comprising a water-insoluble calcium phosphate polishing agent, an organic detergent, water and a humectant, and having incorporated therein at least about ½% by weight of a partial glyceryl ester of a higher fatty acid as an agent to stabilize the cream against hardening in tubes, separation of liquids from solids and formation of graininess.

2. A dental cream in accordance with claim 1 wherein said detergent is a higher fatty acid monoglyceride monosulfate detergent.

3. A dental cream in accordance with claim 1 wherein said detergent is a water-soluble salt of a higher fatty acid amide of an amino carboxylic acid.

4. A dental cream comprising dicalcium phosphate dihydrate and from about ½ to 20% of a higher fatty acid monoglyceride as a stabilizing agent therefor.

5. A dental cream in accordance with claim 4 which contains a glyceryl monoester of coconut oil fatty acids.

6. A dental cream comprising dicalcium phosphate dihydrate, non-soap organic detergent and from about ½ to 10% by weight of a glyceryl monoester of a higher fatty acid.

7. A dental cream comprising dicalcium phosphate dihydrate, humectant, and from about ½ to 10% by weight of a glyceryl monoester of a higher fatty acid.

8. A dental cream in accordance with claim 7 which contains sorbitol.

References Cited in the file of this patent

UNITED STATES PATENTS

| 2,236,828 | Muncie | Apr. 1, 1941 |

FOREIGN PATENTS

| 675,837 | Germany | May 22, 1939 |

OTHER REFERENCES

Bennett: The Cosmetic Formulary, vol. 1, Chemical Publishing Company of New York, Inc., N. Y., pgs. 211 to 212 (1937).

UNITED STATES PATENT OFFICE
CERTIFICATE

Patent No. 2,744,049                                                                        May 1, 1956

Gerhard Martin Salzmann and Robert Joseph Schiraldi

Application having been made jointly by Gerhard Martin Salzmann and Robert Joseph Schiraldi, the inventors named on the above identified patent, the Colgate-Palmolive Company, a corporation of Delaware, assignee, and Kenneth Lyman Russell of Nutley, New Jersey, for the issuance of a certificate under the provisions of Title 35, Section 256 of the United States Code, adding the name of the said Kenneth Lyman Russell to the patent as a joint inventor, and deleting the name of the said Robert Joseph Schiraldi from the patent as a joint inventor, and a showing and proof of facts satisfying the requirements of said section having been submitted, it is this fifteenth day of October, 1957, certified that the name of the said Kenneth Lyman Russell is hereby added to the patent as a joint inventor with the said Gerhard Martin Salzmann and that the name of Robert Joseph Schiraldi is hereby deleted from the said patent as a joint inventor with the said Gerhard Martin Salzmann.

[SEAL]

ARTHUR W. CROCKER,
*First Assistant Commissioner of Patents.*